E. L. CHAMBERLIN.
Shaft-Supporter for Vehicles.
No. 201,329. Patented March 19, 1878.
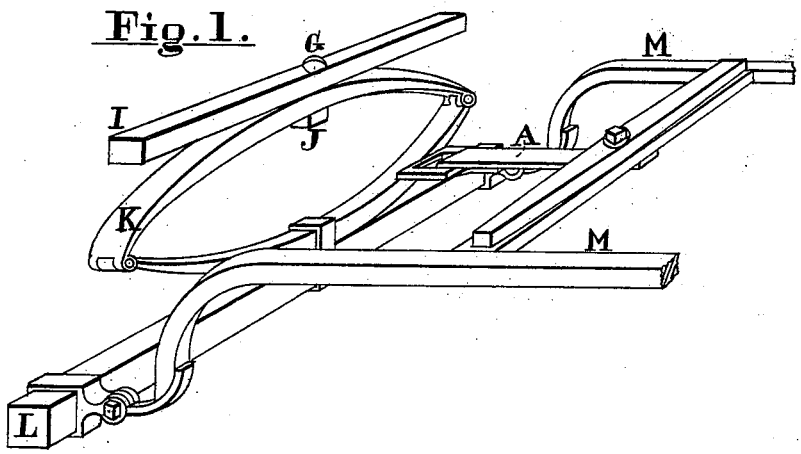
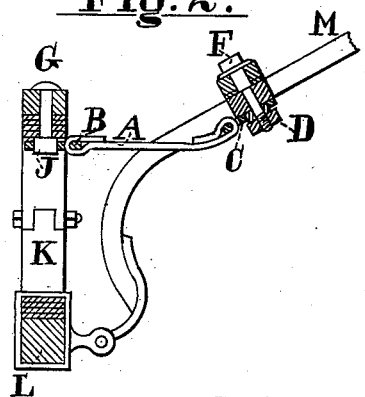
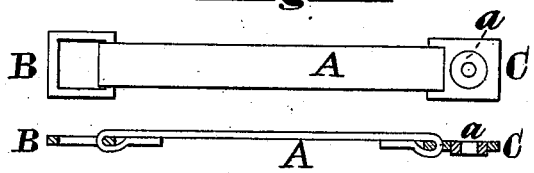

UNITED STATES PATENT OFFICE.

ELIAS L. CHAMBERLIN, OF MONROE, OHIO.

IMPROVEMENT IN SHAFT-SUPPORTERS FOR VEHICLES.

Specification forming part of Letters Patent No. 201,329, dated March 19, 1878; application filed February 8, 1878.

*To all whom it may concern:*

Be it known that I, ELIAS L. CHAMBERLIN, of Monroe, in the county of Butler and State of Ohio, have invented a new and useful Improvement in Shaft-Supporters for Carriages; and I do hereby declare that the following is a full and exact description thereof, reference being had to the accompanying drawings, and to the letters of reference marked thereon.

Figure 1 is a perspective view of the front part of a carriage-gear with my improved supporter attached. Fig. 2 is a central vertical section of the same. Fig. 3 represents a plan and central section of the supporter detached.

My invention is intended to support the shafts of a carriage in an elevated position and out of the way of a horse, being placed in proper position to be hitched to the carriage.

The supporter may be made of flexible material, and provided with plate metal loops or fastenings, so constructed and connected with the shafts that when the latter are raised up they may be held by means of the supporter, which, for the purpose, can be catched on the nut under the upper half of the front carriage-spring, and, when desired to release the shafts the fastening will detach itself from the nut by a slight upward movement given to the carriage-shafts.

In the drawings, A denotes the body of the supporter, B and C, its fastenings; D, the nut of the single-tree-bolt F; G, the bolt securing the spring I; L, the axle, and M the shafts.

The supporter is permanently secured to the bolt F under the cross-piece of shafts M by means of nut D. The washer or ring $a$, which is made of thicker metal than the fastening C, which fits upon it, is placed upon bolt F, and serves as a journal for the fastening C. The object of this construction is to permit supporter A to be turned partly around, so as to be inserted in a leather or metal loop or pocket attached to the under side of the cross-bar of the shafts.

The rectangular plate metal fastening B has an opening larger than the nut J, on which it will be placed to hold up the shafts, as represented in Fig. 2, and consequently it will detach itself and drop from connection with nut J when the shafts suspended by the supporter are slightly raised.

From the foregoing description it will be understood that the supporter A will hold the shafts in the position shown in Fig. 2 while a horse is placed below them, ready to be hitched to the vehicle. Then the attendant, without manipulating the supporter A, will slightly raise the shafts, which will discharge fastening B from nut J, and allow the shafts to descend, preparatory to securing the animal to the carriage.

When the supporter is not in use it may be inserted in a pocket under the cross-bar of the shafts, as before described.

I claim as my invention—

The self-detaching supporter A, provided with fastenings B C $a$, in combination with carriage-gearing, substantially as and for the purpose described.

Witness my hand this 31st day of January, A. D. 1878.

ELIAS L. CHAMBERLIN.

Attest:
L. M. HOSEA,
H. P. K. PECK.